United States Patent
Hojo et al.

(10) Patent No.: US 10,624,339 B2
(45) Date of Patent: Apr. 21, 2020

(54) METHOD OF CONTROLLING FILBERTWORM

(71) Applicant: Shin-Etsu Chemical Co., Ltd., Tokyo (JP)

(72) Inventors: Tatsuya Hojo, Joetsu (JP); Erina Ohno, Joetsu (JP); Naoki Ishibashi, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/823,455

(22) Filed: Aug. 11, 2015

(65) Prior Publication Data

US 2016/0044918 A1 Feb. 18, 2016

(30) Foreign Application Priority Data

Aug. 15, 2014 (JP) ................. 2014-165454

(51) Int. Cl.
*A01N 37/02* (2006.01)
(52) U.S. Cl.
CPC .................... *A01N 37/02* (2013.01)
(58) Field of Classification Search
CPC .............................. A01N 37/02; A01N 37/12
See application file for complete search history.

(56) References Cited

U.S. PATENT DOCUMENTS

| | | | | |
|---|---|---|---|---|
| 6,521,224 B1 * | 2/2003 | Ogura | ................... | A01N 25/00 424/405 |
| 2004/0197365 A1 | 10/2004 | Fukumoto et al. | | |
| 2013/0096207 A1 * | 4/2013 | Yamashita | ............. | A01N 25/28 514/772.2 |

FOREIGN PATENT DOCUMENTS

EP 2 465 349 A2 6/2012

OTHER PUBLICATIONS

Stelinski, L.L. et al., J. Chem. Ecol. vol. 34 pp. 1107-1113. Published 2008.*
Carde, R.T. et al., Annu. Rev. Entomol. vol. 40, 559-585. Published 1995.*
Davis, H.G. et al., J. Chem. Ecol. vol. 10 pp. 53-68. Published 1984.*
Davis et al (Journal of Chemical Ecology vol. 10 pp. 53-61. Published 1984.*
Davis et al., Journal of Chemical Ecology vol. 10 pp. 53-61. Published 1984 (Year: 1984).*
Davis et al. "Filbertworm Sex Pheromone Identification and Field Tests of (E,E)- and (E,Z)-8, 10-Dodecadien-1-ol Acetates", *J. Chem. Ecology* 10(1):53-61 (1984).
Office Action corresponding to Japanese Patent Application No. 2014-165454 (6 pages) (dated Feb. 14, 2017).

* cited by examiner

*Primary Examiner* — Timothy P Thomas
*Assistant Examiner* — George W Kosturko
(74) *Attorney, Agent, or Firm* — Myers Bigel, P.A.

(57) ABSTRACT

There is provided a method of controlling filbertworm capable of reducing the number of release positions without changing a dosage amount per unit area. More specifically, there is provided a method of controlling filbertworm comprising the step of: providing E,E-8,10-dodecadienyl acetate or a composition comprising 80% by weight or more of E,E-8,10-dodecadienyl acetate at 1 to 100 release positions/ha to release the E,E-8,10-dodecadienyl acetate at a release rate of from 0.01 to 5 g/day/ha for mating disruption.

9 Claims, No Drawings

METHOD OF CONTROLLING FILBERTWORM

RELATED APPLICATION

This application claims priority from Japanese Patent Application No. 2014-165454, filed Aug. 15, 2014, the disclosure of which is incorporated by reference herein in its entirety.

FIELD AND BACKGROUND OF THE INVENTION

The present invention relates to a method of controlling filbertworm by mating disruption in which a sex pheromone component of the filbertworm is released in a field to disturb the mating behavior of the insect pest with the sex pheromone component.

Insect pest control by mating disruption is carried out by releasing and floating in an air an artificially synthesized sex pheromone component of an insect pest to be controlled for disturbing mating between males and females of the insect pest to decrease their mating rate, and to suppress the birth of next generation. The sex pheromone component differs depending on the kind of insect pest and further, it is species-specific. A natural sex pheromone composition of an insect pest is therefore identified by a direct method in which the natural sex pheromone composition is extracted from a pheromone gland of the insect pest with a solvent; an indirect method such as pheromone lure or EAG (electroantennogram); or a method of combination of the direct and indirect methods. Consequently, the components and composition ratio thereof are predetermined. For most of the mating disruption, components and composition ratio same as those of a natural sex pheromone composition of an insect pest to be controlled are conventionally used. However, since the natural sex pheromone composition of an insect pest is often a mixture of a plurality of sex pheromone components, there are cases where the components completely same as those of the natural sex pheromone composition of an insect pest cannot be used for mating disruption. In such cases, at least a main component having a highest composition ratio in the natural sex pheromone composition is used.

It is known that the natural sex pheromone composition of filbertworm (*Melissopus latiferreanus*), which is an insect pest in hazelnuts, is a 4.3:1 mixture of E,Z-8,10-dodecadienyl acetate and E,E-8,10-dodecadienyl acetate, where the former is a main component and the latter is a subsidiary component having a composition ratio lower than that of the main component (H. G. Davis, J. Chem. Ecol., January 1984, Volume 10, Issue 1, pp 53-61).

SUMMARY OF THE INVENTION

An effective synthesis process of E,Z-8,10-dodecadienyl acetate, which is a main component, has not yet been established. The E,Z-8,10-dodecadienyl acetate cannot be industrially produced in high purity even by isomerization of E,E-8,10-dodecadienyl acetate, which can already be mass-synthesized. Even if it can be produced in high purity, its price is presumed to be high.

An object of the invention is to control filbertworm by mating disruption with a subsidiary component in a natural sex pheromone composition of the insect pest, in the absence of the main component or in the presence of a reduced amount of the main component.

As a result of studying a mating disruption method of not using the main component in a natural sex pheromone composition of filbertworm, the present inventors have found that the insect pest can be controlled by mating disruption using a subsidiary component in the of the natural sex pheromone composition.

In the present invention, there is thus provided a method of controlling filbertworm comprising the step of providing E,E-8,10-dodecadienyl acetate or a composition comprising 80% by weight or more of E,E-8,10-dodecadienyl acetate at 1 to 100 release positions/ha to release the E,E-8,10-dodecadienyl acetate at a rate of from 0.01 g to 5 g/day/ha for mating disruption.

According to the present invention, mating disruption of using the main component in the natural sex pheromone substance of filbertworm as less as possible but using the subsidiary component mainly allows filbertworm to be controlled at reduced release positions without changing a dosage amount per unit area.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

According to the present invention, there can be provided a method of controlling filbertworm by mating disruption of not using or almost not using E,Z-8,10-dodecadienyl acetate, which is a main component having the highest composition ratio in the natural sex pheromone composition of filbertworm, but using E,E-8,10-dodecadienyl acetate, which is a subsidiary component having a composition ratio lower than that of the main component.

The term "main component" as used herein means a single component in the natural sex pheromone composition of the insect pest containing only the single component; or a component having the highest composition ratio in the composition containing two or more components. The composition ratio of the component having the highest composition ratio is higher than the composition ratio at which all the components are contained in the same amounts. For example, it is higher than 50% by weight when the composition contains two components, or higher than 33.3% by weight when the composition contains three components. Accordingly, the main component in the natural sex pheromone composition of filbertworm is E,Z-8,10-dodecadienyl acetate, and the subsidiary component therein is E,E-8,10-dodecadienyl acetate.

In the method of controlling filbertworm, mating disruption is carried out using E,E-8,10-dodecadienyl acetate, which is a subsidiary component in the natural sex pheromone composition. However, a composition containing one or more components in addition to E,E-8,10-dodecadienyl acetate can be also used. This means that E,E-8,10-dodecadienyl acetate may be used alone or as a composition comprising 80% by weight or more, preferably 90% by weight or more of E,E-8,10-dodecadienyl acetate for the mating disruption.

The E,E-8,10-dodecadienyl acetate-containing composition may comprise E,Z-8,10-dodecadienyl acetate, which is a main component in the natural sex pheromone composition of filbertworm. For example, the E,E-8,10-dodecadienyl acetate-containing composition may comprise E,Z-8,10-dodecadienyl acetate in an amount of 15% by weight or less based on the total amount of E,Z-8,10-dodecadienyl acetate and E,E-8,10-dodecadienyl acetate. In other words, a weight ratio of E,Z-8,10-dodecadienyl acetate to E,E-8,10-dodecadienyl acetate is preferably from 0:100 to 15:85, more preferably from 0:100 to 10:90, still more preferably from 1:99 to 5:95. In fact, industrially produced E,E-8,10-dodecadienyl acetate contains from about 1% by weight to about 10% by weight of E,Z-8,10-dodecadienyl acetate.

Further, the composition may comprise Z,E-8,10-dodecadienyl acetate in an amount of preferably 10% by weight or less, more preferably 5% by weight or less; and/or Z,Z-8,10-dodecadienyl acetate in an amount of preferably 10% by weight or less, more preferably 5% by weight or less.

The E,E-8,10-dodecadienyl acetate-containing composition may further comprise an antioxidant such as 2,6-ditert-butyl-4-methylphenol (BHT), butylhydroxytoluene, butylhydroxyanisole, hydroquinone or Vitamin E; or an ultraviolet absorber such as 2-hydroxy-4-octoxybenzophenone, 2-(2'-hydroxy-3'-tert-butyl-5'-methylphenyl)-5-chlorobenzotriazole (HBMCBT). The content of the antioxidant in the composition is, for example, from 0 to 5% by weight, while the content of the ultraviolet absorber is, for example, from 0 to 5% by weight.

In the insect pest control method, the way in which a sex pheromone component is released into the air is not limited insofar as mating disruption is achieved. It is desired to actively or passively carry out the release by using a sustained release preparation in the form of a tube, a capsule, an ampoule, a can or a bag, each being filled with E,E-8,10-dodecadienyl acetate alone or a composition containing 80% by weight or more of E,E-8,10-dodecadienyl acetate. Examples of the passive release include atomization and spraying, while those of the passive release include permeation through a container or a carrier.

The sustained release preparation in tube form is most suited because it permits uniform release of a sex pheromone or the like over a long period of time. The tube has an inner diameter of preferably from 0.5 to 2.0 mm and a thickness of preferably from 0.2 to 1.0 mm from the standpoint of continuing release at an adequate release rate. An amount to be carried per meter of a tube is preferably from 150 mg to 3.5 g. In order to reduce the number of release positions without changing a dosage amount per unit area, it is desired to change the length of the tube without changing an amount to be filled per unit length of the tube. The length is preferably from 0.2 to 100 m, more preferably from 0.5 to 20 m, still more preferably from 1 to 10 m. The length is not limited to them when two or more tubes are connected parallel to each other.

The container or carrier is not particularly limited insofar as it permits sustained release of the sex pheromone component. It desirably comprises a polymer. Examples of the polymer include polyolefins such as polyethylene and polypropylene, and copolymers containing 80% by weight or more of ethylene units typified by ethylene-vinyl acetate copolymer and ethylene-acrylate ester copolymer. The container or carrier comprising the polymer permits permeation of the sex pheromone or the like therethrough and release of it outside of the polymer film at an adequate rate. Alternatively, biodegradable polyester or polyvinyl chloride may be used.

The number of release positions of E,E-8,10-dodecadienyl acetate, that is, an arrangement density of the sustained release preparations, comprising E,E-8,10-dodecadienyl acetate and being uniformly arranged in a field for mating disruption, is from 1 to 100 release positions/ha, preferably from 5 to 50 release positions/ha. For the conventional mating disruption of using E,Z-8,10-dodecadienyl acetate, which is the main component in the natural sex pheromone composition of filbertworm, the number of release positions is as many as 250 to 1000 release positions/ha. Such many release positions are provided presumably because the sex pheromone component is released uniformly in a field and the release positions act as if they were females. However, many release positions per unit area are inappropriate when the number of release positions is reduced without changing the dosage amount per unit area, in other words, when a large amount of the main sex pheromone component is released from one release position. That is because the female-like actions are enhanced so that the males are likely to gather. On the other hand, when the insect pest is controlled by mating disruption of using E,E-8,10-dodecadienyl acetate, which is a subsidiary component in the natural sex pheromone composition of filbertworm, the mating disruption can be carried out effectively even when a release amount is increased and the number of release positions is reduced. That is because the subsidiary component does not act like females to the extent of the main component and the males do not gather.

A release amount per release position depends on the environment of the field, weather conditions or the like. The release amount per release position is not particularly limited insofar as it is enough for uniform release in the field. Similar to the conventional release amount, it is preferably from 1 mg to 1000 mg/day/position, more preferably from 2 mg to 500 mg/day/position. More specifically, when E,E-8,10-dodecadienyl acetate alone or a composition containing 80% by weight or more of E,E-8,10-dodecadienyl acetate is provided at 1 to 100 release positions/ha, a release amount per release position is selected to allow E,E-8,10-dodecadienyl acetate to be released in a release amount of from 0.01 g to 5 g/day/ha.

The present invention will hereinafter be described on basis of Examples and Comparative Examples. However, it should not be construed that the invention is limited to or by Examples.

EXAMPLES

<Production of Sustained Release Preparation>

Polyethylene tube was selected as a polymer container. Each sustained release preparation was produced by injecting a sex pheromone composition of filbertworm into the polyethylene tube having an inner diameter of 1.40 mm, a thickness of 0.40 mm and a length of 1 m from one end of the tube, and melt-sealing the both ends of the tube under pressure while applying high-frequency heat. The produced sustained release preparations were provided separately at equal intervals in each plot for insect pest control to release a necessary amount of the sex pheromone substance.

<Percentage of Damage>

A percentage of damage can provide estimate of a mating disruption effect. The percentage of damage is one of the criteria for determining the mating disruption effect and is represented by {(number of nuts damaged)/(the number of nuts investigated)}×100. In general, the smaller the percentage of damage is, the greater the mating disruption effect is. The control standard of hazelnuts in USA is said to be based on the percentage of damage of not greater than 0.6%. A sustained release preparation resulting in a percentage of damage of smaller than 0.6% is determined to be effective, while a sustained release preparation resulting in a percentage of damage of greater than 0.6% is determined to be ineffective.

Examples 1-2 and Comparative Example 1

Mating disruption tests of filbertworm, which is an insect pest of hazelnuts, were carried out. Components of each plot are as shown in Table 1. Each sustained release preparation was produced in the above method to be in the form of small polymer tube having a length of 1 m. It contained 1.2 g, in total, of E,E-8,10-dodecadienyl acetate and E,Z-8,10-dodecadienyl acetate, 25 mg of BHT (2,6-di-tert-butyl-4-methylphenol), and 25 mg of HBMCBT (2-(2'-hydroxy-3'-tert-butyl-5'-methylphenyl)-5-chlorobenzotriazole). Fifty small tubes/ha were placed uniformly in each plot on April 25 and a percentage of damage was measured in the harvest season in October. The results are shown in Table 2.

The "weight ratio" in Table 1 shows a weight ratio in a mixture of a main component, a subsidiary component, impurities thereof inevitably contained during production and the like, and components having physicochemical actions such as a stabilizer or a diluent are excluded from the calculation of the ratio.

TABLE 1

| | plot | pheromone components and weight ratio thereof *1 | | content (% by weight) |
|---|---|---|---|---|
| Example 1 | 1 | (main) E,Z-8,10-dodecadienyl acetate | 2 | 2 |
| | | (subsidiary) E,E-8,10-dodecadienyl acetate | 98 | 93 |
| Example 2 | 2 | (main) E,Z-8,10-dodecadienyl acetate | 9 | 8 |
| | | (subsidiary) E,E-8,10-dodecadienyl acetate | 91 | 80 |
| Comp. Ex. 1 | 3 | (main) E,Z-8,10-dodecadienyl acetate | 17 | 13 |
| | | (subsidiary) E,E-8,10-dodecadienyl acetate | 83 | 62 |

*1 The terms (main) and (subsidiary) mean the main and subsidiary components in the natural pheromone composition, respectively.

TABLE 2

| | plot | percentage (%) of damage in the harvest season |
|---|---|---|
| Example 1 | 1 | 0.17 |
| Example 2 | 2 | 0.54 |
| Comp. EX. 1 | 3 | 0.78 |

In Comparative Example 1, the composition containing 62% by weight of E,E-8,10-dodecadienyl acetate, which is the subsidiary component in the natural sex pheromone composition of filbertworm, was used, and resulted in a percentage of damage of 0.78% in the harvest season, exceeding the control standard. On the other hand, in Examples 1 and 2, the compositions containing 80% by weight or more of E,E-8,10-dodecadienyl acetate were used, and resulted in each percentage of damage of lower than the control standard. Thus, control of insect pest was confirmed.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

That which is claimed:

1. A method of controlling filbertworm, the method comprising:
    providing E,E-8,10-dodecadienyl acetate or a composition comprising 80% by weight or more of E,E-8,10-dodecadienyl acetate in a field at an arrangement density of 1 to 100 release positions/ha to release the E,E-8,10-dodecadienyl acetate at a rate of from 0.01 to 5 g/day/ha for controlling the filbertworm and provide a dosage amount per unit area based on a total area of the field,
    wherein the arrangement density is uniform in the total area of the field and the dosage amount per unit area is unchanged in the field,
    wherein the composition comprises 0% to 15% by weight of E,Z-8,10-dodecadienyl acetate based on a total amount of the E,Z-8,10-dodecadienyl acetate and the E,E-8,10-dodecadienyl acetate.

2. The method of controlling filbertworm according to claim 1, wherein the composition comprises 10% by weight or less of Z,E-8,10-dodecadienyl acetate and/or 10% by weight or less of Z,Z-8,10-dodecadienyl acetate.

3. The method of controlling filbertworm according to claim 1, wherein the composition comprises 0% to 10% by weight of the E,Z-8,10-dodecadienyl acetate based on a total amount of the E,Z-8,10-dodecadienyl acetate and the E,E-8,10-dodecadienyl acetate.

4. The method of controlling filbertworm according to claim 1, wherein the composition has a weight ratio of E,Z-8,10-dodecadienyl acetate to E,E-8,10-dodecadienyl acetate of 0:100 to 15:85.

5. The method of controlling filbertworm according to claim 1, wherein the composition has a weight ratio of E,Z-8,10-dodecadienyl acetate to E,E-8,10-dodecadienyl acetate of 0:100 to 10:90.

6. The method of controlling filbertworm according to claim 1, wherein the composition has a weight ratio of E,Z-8,10-dodecadienyl acetate to E,E-8,10-dodecadienyl acetate of 0:100 to 5:95.

7. The method of controlling filbertworm according to claim 1, wherein the composition has a weight ratio of E,Z-8,10-dodecadienyl acetate to E,E-8,10-dodecadienyl acetate of 1:99 to 5:95.

8. The method according to claim 1, wherein the E,E-8,10-dodecadienyl acetate or the composition is provided in the total area of the field at an arrangement density of 5 to 50 release positions/ha.

9. The method according to claim 1, wherein the method of controlling the filbertworm is mating disruption of the filbertworm.

* * * * *